Sept. 26, 1933.  H. A. YOUNG  1,927,972
CONTROL VALVE
Filed July 28, 1932

Inventor
Harold A. Young
By Lyon & Lyon
Attorneys

Patented Sept. 26, 1933

1,927,972

UNITED STATES PATENT OFFICE 1,927,972

CONTROL VALVE

Harold A. Young, Riverside, Calif., assignor of one-half to George Wylie Thompson, La Canada, Calif.

Application July 28, 1932. Serial No. 625,555

5 Claims. (Cl. 137—153)

This invention relates to control valves, and particularly to valves for automatically maintaining any desired pressure in a line or container to which it may be connected.

A broad object of the invention is to provide a simple and inexpensive valve structure that may be easily and rapidly adjusted to give any pressure within predetermined limits and that will thereafter automatically admit or release fluid to a container connected thereto as necessary to maintain a desired pressure therein.

A full understanding of the invention may be had from the following detailed description read in connection with the accompanying drawing, in which.

Figure 1:
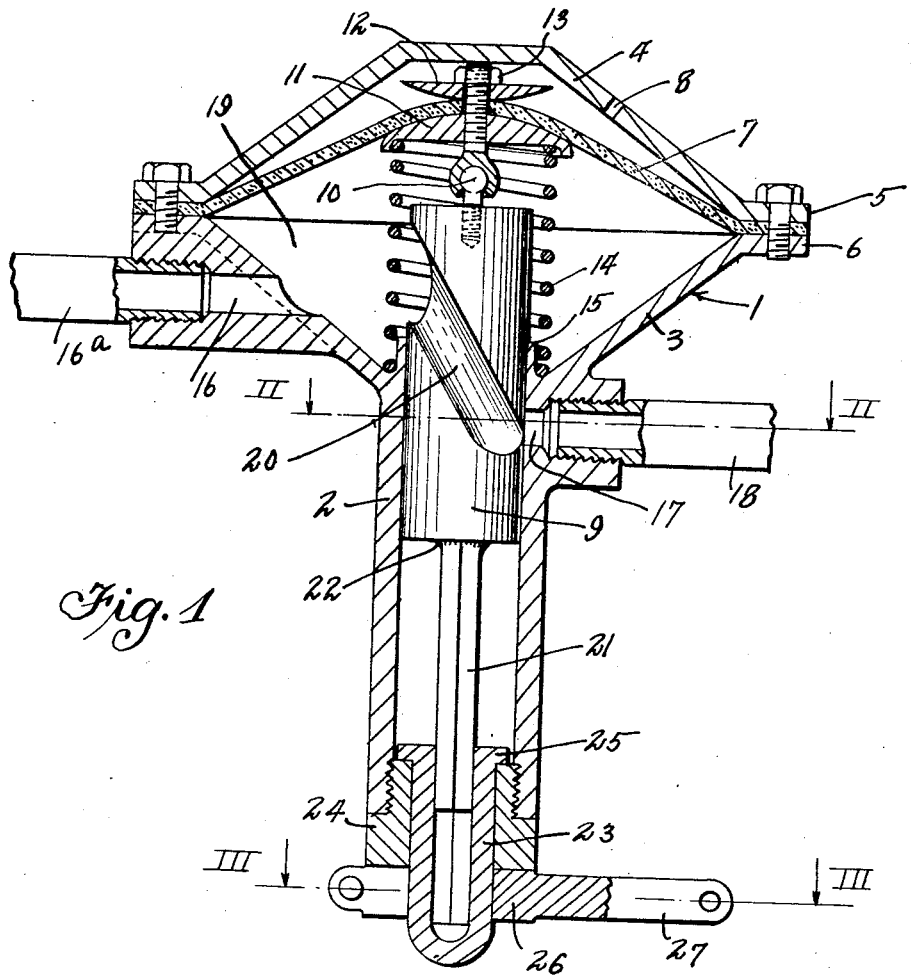
Figure 1 is an elevational sectional view through the device comprising the invention.
Figure 3:
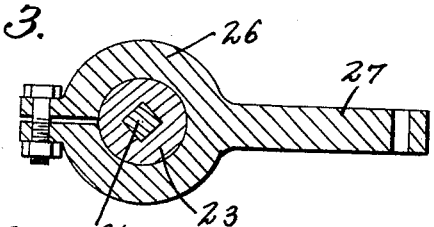
Figure 3 is a cross sectional view in the plane III—III of Figure 1.

Referring to the drawing, my valve comprises an outer case designated generally at 1 made up of a lower section comprising a cylinder 2, and an upper section comprising a flared skirt 3. The upper end of the case is closed by a cover 4 which is provided with a flange 5 at its outer edge which bolts to a flange 6 on the outer edge of the skirt portion 3.

A diaphragm 7 of flexible material such as rubber or leather is mounted within the chamber formed by the flared portion 3 and the cover 4, this diaphragm being clamped in place and sealed with respect to the case by having its edges compressed between the flanges 5 and 6. The portion of the chamber above the diaphragm 7 is maintained at atmospheric pressure by means of a vent hole 8 in the cover 4.

Mounted within the cylinder 2 is a piston 9 which is ground to fit snugly within the cylinder but is free to move longitudinally or to rotate therein. The piston is secured at its upper end by a ball and socket link, designated generally at 10, to the center of diaphragm 7, the connection between the link 10 and the diaphragm being made by passing the link through an aperture in the center of the diaphragm and clamping the diaphragm between a pair of washers 11 and 12 respectively. Thus, the lower washer 11 may be threaded upon the upper extension of the link 10 and the upper washer 12 compressed against the diaphragm by means of a nut 13 on the extreme upper end of the link member. The upper surface of the lower washer 11 and the lower surface of the upper washer 12 are preferably rounded, as shown, so that no sharp edges will be forced against the diaphragm.

The piston 9 and the diaphragm 7 are normally maintained in uppermost position by a spiral spring 14 positioned between the lower washer 11 and the upper end of cylinder 2, the latter being provided with an upwardly extended lip 15 about which the spring fits. The outwardly flared skirt 3 on the case 1 is provided with a passage 16 adapted to be connected by a pipe 16a to a line or container in which a predetermined fluid pressure is to be maintained, and a port 17 is provided in the wall of cylinder 2, this port connecting by a pipe 18 to a vacuum pump. The valve shown is particularly designed to automatically maintain a desired pressure less than atmospheric within the chamber 19 below the diaphragm 7, and hence in any container connected thereto by pipe 16a and passage 16, and air is permitted to be withdrawn from chamber 19, by way of the port 17 and pipe 18, through a helical groove formed in the outer surface of the piston 9. This helical or spiral groove has its lower end normally juxtaposed to, or extended below, the port 17 and has its upper end extended substantially to the upper end of piston 9 where it opens into the chamber 19.

To permit of manual adjustment to vary the pressure maintained in chamber 19, a squared shaft 21 is secured to the lower end of piston 9 in any suitable manner. Thus, the upper end of the squared shaft 21 has been shown welded or soldered to the lower face of piston 9 as indicated at 22. Shaft 21 extends downwardly from a distance below the piston 9 and is fitted at its lower end into a square passage in a sleeve 23, the latter having a cylindrical outer surface and being rotatably mounted within a bushing 24 threaded into the lower end of cylinder 2. Sleeve 23 is prevented from moving longitudinally within bushing 24 by an outwardly extending flange 25 on its upper edge and by a clamp 26 secured thereto at its lower end. Clamp 26 is provided with an arm 27 formed integrally therewith, which may be connected by a link to any desired operating mechanism. When sleeve 23 is rotated by revolving the arm 27, it rotates the squared shaft 21 and the piston 9. However, squared shaft 21 is free to slide longitudinally within sleeve 23 and therefore the latter does not in any way restrain upward or downward movement of the piston 9.

The device described functions as follows:

Assume that the pipe 16a connects to a chamber to be exhausted, such as the cylinder of a vacuum pump or any other device, the pressure within which is to be accordingly controlled, and varied between predetermined limits. Also, assume that pipe 18 is connected to some vacuum producing device which may be a pump designed especially for that purpose, or, in some specific applications of the invention, may be the intake manifold of an internal combustion engine.

Figure 2:
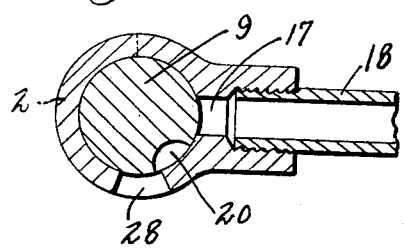
Figure 2 is a cross sectional view in the plane II—II of Figure 1.

As shown in Figures 1 and 2, the piston 9 is in its normal position in which the lower end of helical groove 20 is out of registration with the port 17 but is just beginning to register with a vent port 28 which opens through the cylinder wall 2 to the atmosphere. The chamber 19 is therefore connected through groove 20 and port 28 to the atmosphere and the pressure in chamber 19 and in the passage 16 and pipe 16a is at atmospheric. Since the chamber above the diaphragm 7 is also vented to the outside through vent 8, the diaphragm 7 is exposed to no differential pressure and the piston 9 is maintained in its uppermost position, as shown, by spring 14.

Now assume that is desired to create and maintain a pressure slightly below atmospheric within the chamber 19 (and of course the device connected thereto by pipe 16a). The arm 27 will be shifted to rotate the sleeve 23 and the piston 9 until the lower end of groove 20 (referring to Figure 2) is moved clear of the vent port 28 and into position where it begins to register with the port 17 connected to the pipe 18 in which a vacuum is maintained by any desired means, as already stated. This connects the chamber 19 with the vacuum pipe 18 through groove 20 and air is exhausted from chamber 19 and pipe 16a until the pressure within chamber 19 is reduced slightly below atmospheric. A differential pressure is thereby produced on opposite sides of diaphragm 7 which moves the latter downward and at the same time moves piston 9 downward. It should be noted that piston 9 is prevented from rotating since the sleeve 23 controlling the squared shaft 21 is held in the position to which it was last moved. As the pressure within chamber 19 is reduced more and more, the piston 9 moves downward against the resistance of spring 14 until the groove 20, because of its spiral shape, is carried below and out of registration with port 17. Thereafter no more air can be exhausted through port 17 from chamber 19 and a position of equilibrium will exist so long as the pressure within chamber 19 remains constant. If through leakage or any other cause the pressure in chamber 19 increases, the piston 9 will be moved upward by spring 14 in response to such increase and will again bring the spiral groove into registration with the vacuum port 17 to again reduce the pressure within chamber 19 to the desired value.

Should it be desired to increase the vacuum within chamber 19 (decrease the pressure) still further, the arm 27 will be revolved into a more advanced position to rotate piston 9 and bring the spiral groove 20 again into registration with the vacuum port 17. This port will thereafter not close until the pressure within chamber 19 has been reduced to a sufficiently lower value to permit the atmospheric pressure acting upon the upper side of diaphragm 7 to further compress the spiral spring 14 and force the diaphragm and piston downward.

It will be apparent from the foregoing description that by rotating the arm 27 to bring the groove 20 into registration with the vacuum port 17, air will be exhausted through groove 20 from chamber 19 until the vacuum therein reaches a sufficiently great value to overcome the upward force exerted by spring 14 and pull the piston down a sufficient distance to move groove 20 out of registration with port 17. Thereafter the piston will move upward or downward as necessary, to open and close the port 17 and maintain a constant pressure within chamber 19.

It will also be apparent that the farther arm 27 is shifted and the farther piston 9 is thereby rotated, the farther down the piston must move to carry the groove 20 out of engagement with the vacuum port 17. Therefore any desired degree of vacuum within wide limits will be automatically maintained within chamber 19 by rotating the piston 9 a desired amount.

If, after the piston 9 has been rotated to create a predetermined vacuum within chamber 19, it is desired to reduce the vacuum to a predetermined lesser value, the arm 27 is moved in reverse direction. This brings groove 20 into registration with the vent port 28 and air is then admitted through vent 28 and groove 20 to chamber 19 until the pressure therein is increased to the value corresponding to the new setting of the arm 27. When this pressure is reached, the diaphragm 7 and piston 9 will have been forced upward by spring 14 to carry the groove 20 out of registration with the vent port 28. The piston will then remain stationary so long as the degree of vacuum within chamber 19 remains constant. Should the vacuum decrease from any cause, piston 9 will be moved upward, thus bringing groove 20 into registration with the vacuum port 17 and restore the pressure to normal value; likewise, should the degree of vacuum in chamber 19 increase through any cause, the diaphragm and piston 9 will move downward until groove 20 is in registration with the vent port 28 which will admit air to reduce the degree of vacuum to the predetermined amount.

It will be apparent from the foregoing description that I have provided a vacuum valve that may be set to any one of an indefinite number of positions and that will automatically maintain a desired degree of vacuum, the degree depending upon the position in which the arm 27 is set. It will also be apparent that I have provided a valve that is extremely simple in construction and operation and involves few moving parts, substantially all of which are completely enclosed and protected.

The valve structure described is particularly useful for maintaining pressures below atmospheric for the reason that the piston 9 will be normally maintained snugly against the cylinder wall adjacent the vacuum port 17 by the suction created through this port. Therefore, little leakage will occur past the edges of piston 9 even though it is not accurately fitted within the cylinder 2.

It will be readily apparent, however, that the valve can be adapted for the control of pressures above atmospheric as well as pressures below atmospheric; for instance, all that is necessary to effect this change is to position the spring 14 between diaphragm 7 and the cover 4, to normally maintain the diaphragm and piston in lowermost position, connect the vent port 28 to a source of fluid pressure above atmospheric, and vent the port 17 to the atmosphere instead of connecting it to a vacuum pump.

Therefore, where the claims specify "fluid pressure", it is to be understood that the term is intended to include both negative pressures below atmospheric, or vacuum pressure, and positive pressures above atmospheric.

My valve may also be adapted to the accurate control of minute variations in pressure by reversing the position of the spring 14 to a position between the cover 4 and the upper side of the diaphragm 7 and applying a normal vacuum to the vent 8 so that the diaphragm 7 is normally drawn to the position shown against the force of the spring. Thus when the valve piston 9 is rotated to bring the groove 20 into communication with the port 17, the initial reduction of pressure below the diaphragm 7 will permit the compressed spring to move the piston 9 rapidly corresponding to the degree of vacuum below the diaphragm. With such construction, the device may be made extremely sensitive to small variations in pressure so that the valve will respond rapidly even though the amount of pressure applied to the port 16 has changed but very little.

I claim:

1. A device of the type described, comprising a pair of members having juxtaposed sealing surfaces, one of said members being independently movable in two paths with respect to said other member while maintaining said surfaces in sealing relation, one of said members having a port extending therethrough to the surface of said other member, and the other member having an elongated channel in its surface at least one edge of which extends at an angle to both of said paths of movement, means responsive to fluid pressure admitted through said channel to move said one member in one of said paths a distance proportional to the pressure, and independent means for moving said one member in said other path, said port and said channel being so positioned relative to each other that movement of said one member in one direction in said last path brings said channel into registration with said port, and resultant movement of said member in said other path, caused by fluid pressure admitted through said port and channel, moves said channel out of registration with said port, means for connecting said port to a source of fluid pressure, and means for connecting said channel to a container in which a desired fluid pressure is to be created.

2. A device of the type described comprising a pair of members having juxtaposed sealing surfaces, one of said members being independently movable in two paths with respect to said other member while maintaining said surfaces in sealing relation, one of said members having a pair of spaced-apart ports extending therethrough to the surface of said other member, and the other member having an elongated channel in its surface extending at an angle to both of said paths of movement, means responsive to fluid pressure admitted through said channel for moving said one member in one of said paths a distance proportional to the pressure, and independent means for moving said one member in said other path, one of said ports and said channel being so positioned with respect to each other that movement of said one member in one direction in said last path brings said channel into registration with said one port, and resultant movement of said one member in said other path caused by fluid pressure admitted through said one port and channel moves said channel out of registration with said one port, the other port being normally positioned on the opposite side of said channel from said first port whereby reversed movement of said movable element in either path brings said channel into registration with said second port, means for connecting said first port to a source of fluid pressure, means for connecting said second port to the atmosphere, and means for connecting said channel to a container in which a desired fluid pressure is to be created.

3. A device of the type described, comprising a cylinder and a piston rotatably and longitudinally movable therein, a pressure port in said cylinder wall, a helical channel in the outer surface of said piston, means responsive to fluid pressure admitted through said channel to move said piston longitudinally in said cylinder a distance proportional to the pressure, independent means for rotating said piston in said cylinder, said pressure port and said channel being so positioned with respect to each other that rotation of said piston in one direction brings said channel into registration with said pressure port and resultant longitudinal movement of said piston caused by fluid pressure admitted through said port and channel moves said channel out of registration with said port, and means for constantly connecting said channel to a container in which a desired fluid pressure is to be created.

4. A device of the type described, comprising a cylinder and a piston rotatably and longitudinally movable therein, a pressure port in said cylinder wall, a vent port in said cylinder wall circumferentially spaced from said pressure port, a helical channel in the outer surface of the said piston, the width of said channel being less than the distance between said pressure and vent ports, means responsive to fluid pressure admitted through said channel to move said piston longitudinally in said cylinder a distance proportional to the pressure, independent means for rotating said piston in said cylinder, said channel being normally positioned substantially between said pressure and vent ports whereby rotation of said piston in one direction brings said channel into registration with said pressure port, and resultant longitudinal movement of said piston caused by fluid pressure admitted through said channel moves said channel out of registration with said port, and whereby rotation of said piston in the opposite direction brings said channel into registration with said vent port and resultant longitudinal movement of said piston caused by release of fluid pressure through said channel and said vent port moves said channel out of registration with said vent port, and means for constantly connecting said channel to a container in which a desired fluid pressure is to be created.

5. In a device of the type described, a cylinder having an enlarged portion at one end thereof, a diaphragm closing said end, a piston mounted in said cylinder, a pressure port in the wall of said cylinder, a vent port in the wall of said cylinder, a helical channel in the outer surface of said piston, said piston being normally positioned to bring said channel between said pressure and vent ports, said piston being attached to said diaphragm for longitudinal movement therewith, spring means for normally maintaining said diaphragm and piston in one end position, means for controlling rotation of said piston within said cylinder independent of longitudinal movement of said piston, said helical groove being so positioned with respect to said pressure and vent ports that rotation of said piston in one direction brings the channel into registration with said pressure port, said channel being constantly connected to the end of said cylinder closed by said diaphragm whereby a variation in pressure within said cylinder produced by connection of said channel with said pressure port acts upon said diaphragm to move said piston in a direction to carry said channel out of registration with said pressure port, and means for connecting said chamber to a container in which a predetermined fluid pressure is to be maintained.

HAROLD A. YOUNG.